United States Patent
Alkadi et al.

(10) Patent No.: US 10,564,667 B2
(45) Date of Patent: Feb. 18, 2020

(54) DYNAMIC DISPLAY

(71) Applicant: Imam Abdulrahman Bin Faisal University, Dammam (SA)

(72) Inventors: Abdullah Alkadi, Dammam (SA); Hally Elkony, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 16/290,392

(22) Filed: Mar. 1, 2019

(65) Prior Publication Data

US 2019/0272004 A1    Sep. 5, 2019

Related U.S. Application Data

(60) Provisional application No. 62/637,914, filed on Mar. 2, 2018.

(51) Int. Cl.
*H04B 5/02* (2006.01)
*G06F 1/16* (2006.01)
(Continued)

(52) U.S. Cl.
CPC ....... *G06F 1/1605* (2013.01); *G05B 23/0264* (2013.01); *G06F 1/1698* (2013.01);
(Continued)

(58) Field of Classification Search
CPC .. G01C 21/206; G01C 21/26; G01C 21/3446; G01C 21/3484; G01C 21/36; G01C 21/3679; G01C 21/3697; G06Q 10/1095; G06Q 30/0259; G06Q 30/0261; G06Q 30/0281; G06Q 50/30; G06Q 90/20; G08G 1/096827; G16H 40/20; G06F 1/1605; G06F 1/1698; G06F 3/0416;
(Continued)

(56) References Cited

U.S. PATENT DOCUMENTS

| 2009/0112473 | A1* | 4/2009 | Lu ........................ G06F 16/904 |
| | | | 701/300 |
| 2009/0216438 | A1* | 8/2009 | Shafer .................... G01C 21/20 |
| | | | 701/414 |

(Continued)

FOREIGN PATENT DOCUMENTS

| CN | 104778644 A | 7/2015 |
| KR | 10-2010-0045296 | 5/2010 |

OTHER PUBLICATIONS

SOPHATAR; Proximity Digital Signage; http://www.sophatar.com/content/1-solutions/solutions-2.html; 2017; 8 Pages.

*Primary Examiner* — Nathan S Taylor
(74) *Attorney, Agent, or Firm* — Oblon, McClelland, Maier & Neustadt, L.L.P.

(57) ABSTRACT

Methods, systems and computer readable media for dynamic displays are described. The dynamic displays can include functions to detect when a user with a device approaches, and request information about the user from the user device. The dynamic display system can then use the information about the user to retrieve other associated information (e.g., a course schedule, calendar, or appointment list) and provide the user with directions to a destination via one or more dynamic displays and/or through navigation instructions sent to the user's device.

20 Claims, 6 Drawing Sheets

(51) Int. Cl.
*H04B 1/40* (2015.01)
*G06F 9/30* (2018.01)
*G06F 3/041* (2006.01)
*G05B 23/02* (2006.01)
*G06F 3/0488* (2013.01)

(52) U.S. Cl.
CPC .......... *G06F 3/0416* (2013.01); *G06F 3/0488* (2013.01); *G06F 9/3004* (2013.01); *H04B 1/40* (2013.01); *H04B 5/02* (2013.01)

(58) Field of Classification Search
CPC ....... G06F 9/3004; G06F 3/0488; H04B 1/40; H04B 5/02; G05B 23/0264
USPC .......................................... 455/566; 701/533
See application file for complete search history.

(56) References Cited

U.S. PATENT DOCUMENTS

| | | | | |
|---|---|---|---|---|
| 2011/0288768 | A1* | 11/2011 | Stefani | G06Q 30/0281 701/533 |
| 2013/0191246 | A1* | 7/2013 | Calman | G06Q 30/0639 705/26.9 |
| 2013/0295872 | A1* | 11/2013 | Guday | H04W 4/90 455/404.1 |
| 2014/0139347 | A1* | 5/2014 | Forster | G06K 7/10128 340/686.6 |
| 2014/0156186 | A1* | 6/2014 | Liu | G01C 21/206 701/533 |
| 2014/0343978 | A1 | 11/2014 | Bisht | |
| 2015/0154643 | A1* | 6/2015 | Artman | G01C 21/206 705/14.66 |
| 2015/0358410 | A1* | 12/2015 | Chandrasekaran | H04W 4/70 709/227 |
| 2016/0125466 | A1* | 5/2016 | Kulkarni | G06F 3/04883 705/14.58 |
| 2016/0147946 | A1* | 5/2016 | Von Reden | G16H 10/60 705/3 |
| 2017/0004273 | A1* | 1/2017 | Mbanefo | G16H 80/00 |
| 2017/0011348 | A1* | 1/2017 | Ziskind | H04L 63/101 |
| 2017/0215031 | A1 | 7/2017 | Harding et al. | |
| 2017/0284811 | A1* | 10/2017 | Liu | G06Q 30/0259 |
| 2018/0330815 | A1* | 11/2018 | Demir | G16H 40/20 |
| 2019/0108909 | A1* | 4/2019 | Lee | G16H 40/20 |
| 2019/0124165 | A1* | 4/2019 | Bundick | H04L 67/18 |

* cited by examiner

US 10,564,667 B2

DYNAMIC DISPLAY

RELATED APPLICATIONS

This application claims the benefit of U.S. Application No. 62/637,914, entitled "Dynamic Display," and filed on Mar. 2, 2018, which is incorporated herein by reference in its entirety.

BACKGROUND

Technical Field

The present disclosure is directed generally to displays, and, more particularly, to systems and methods for dynamic displays.

Background

A person's working memory can be easily overloaded by unnecessary, unrelated detail, which can turn expected spatial orientation tasks (e.g., navigating a large educational or medical campus) into an extremely stressful ordeal, particularly for disoriented or distressed patients, non-English speaking individuals and those with reading difficulties.

Accordingly, in order to abridge the huge amount of information required to navigate within a large or complex area (e.g., a university or hospital campus), a need exists for a wayfinding system that can present information in an easy-to-understand and an-easy-to-remember fashion, by delivering concise messages in the needed spot and by classifying incongruent pieces of information into meaningful clusters with defined characteristics and locations (e.g., by using chunking principles).

SUMMARY

Some implementations can include a dynamic display system comprising a processor, a display coupled to the processor, and a transceiver coupled to the processor. The processor can be configured to perform operations. The operations can include detecting presence of a device using the transceiver, and obtaining device information from the device. The operations can also include transmitting, to a server, a request for information associated with the device, and receiving, from the server, the information associated with the device. The operations can further include displaying a destination on the display, wherein the destination is based on the information associated with the device.

The operations can also include displaying an estimated time of arrival on the display, wherein the estimated time of arrival is based on a location of the device and the destination. The operations can further include transmitting from the dynamic display system to another system a check-in message.

The operations further include receiving, at the display, a direction transfer request, and, in response to the direction transfer request, transmitting a direction instruction to the device. In some implementations, the transceiver can include a near field communication transceiver. In some implementations, the device is a mobile phone equipped with a communication section arranged to communicate with the transceiver.

The operations can also include storing a log of prior communications between the dynamic display system and one or more other devices and receiving a contact list from the device. The operations can also include determining if any contacts in the contact list are near the destination, and transmitting a message to any of the contacts near the destination.

The operations can further include detecting, at the dynamic display system, a user at a first location, and providing first direction instructions to the user. The operations can also include determining a subsequent location of the user, and providing second direction instructions to the user via another dynamic display. In some implementations, the information associated with the device can include schedule information for a user of the device.

Some implementations can include a method. The method can include detecting presence of a device via a transceiver of a dynamic display, and obtaining device information from the device. The method can also include transmitting, to a server, a request for information associated with the device, and receiving, from the server, the information associated with the device. The method can further include displaying a destination on a display, wherein the destination is based on the information associated with the device.

The method can also include displaying an estimated time of arrival on the display, wherein the estimated time of arrival is based on a location of the device and the destination. The method can further include transmitting from the dynamic display to another system a check-in message.

The method can also include receiving, at the display, a direction transfer request, and, in response to the direction transfer request, transmitting a direction instruction to the device. In some implementations, the transceiver can include a near field communication transceiver. In some implementations, the device is a mobile phone equipped with a communication section arranged to communicate with the transceiver.

The method can also include storing a log of prior communications between the dynamic display and one or more other devices, and receiving a contact list from the device. The method can further include determining if any contacts in the contact list are near the destination, and transmitting a message to any of the contacts near the destination.

The method can also include detecting, at the dynamic display, a user at a first location, and providing first direction instructions to the user. The method can further include determining a subsequent location of the user, and providing second direction instructions to the user via another dynamic display. In some implementations, the information associated with the device can include schedule information for a user of the device.

Some implementations can include a nontransitory computer readable medium having stored thereon software instructions that, when executed by one or more processors, cause the one or more processors to perform operations. The operations can include detecting presence of a device via a transceiver of a dynamic display, and obtaining device information from the device. The operations can also include transmitting, to a server, a request for information associated with the device, and receiving, from the server, the information associated with the device. The operations can further include displaying a destination on a display, wherein the destination is based on the information associated with the device.

The operations can also include storing a log of prior communications between the dynamic display and one or more other devices, and receiving a contact list from the device. The operations can further include determining if any contacts in the contact list are near the destination, and transmitting a message to any of the contacts near the destination.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
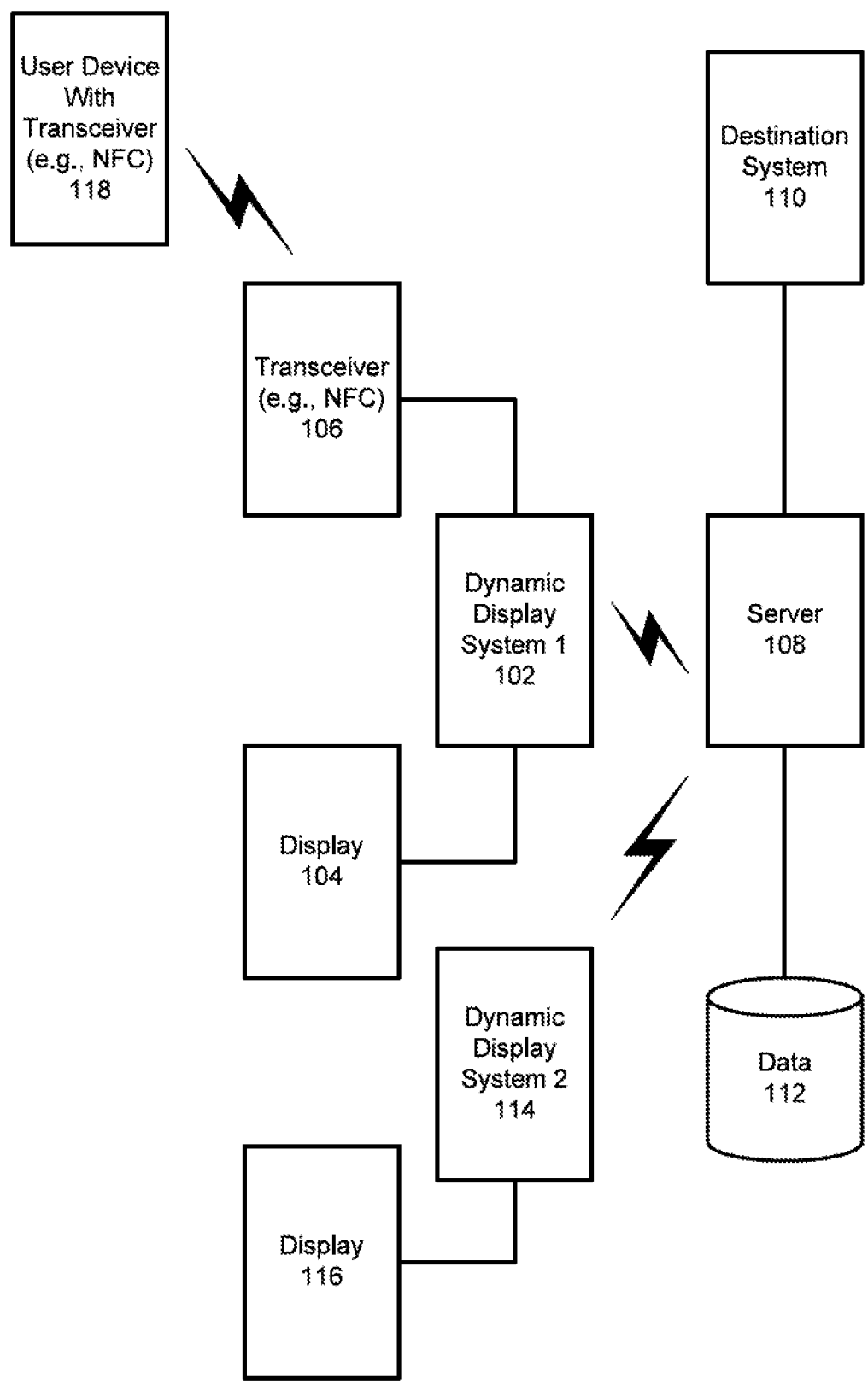
FIG. 1 is a diagram of an example dynamic display environment in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to methods, systems, and computer readable media for dynamic displays.

Figure 5:
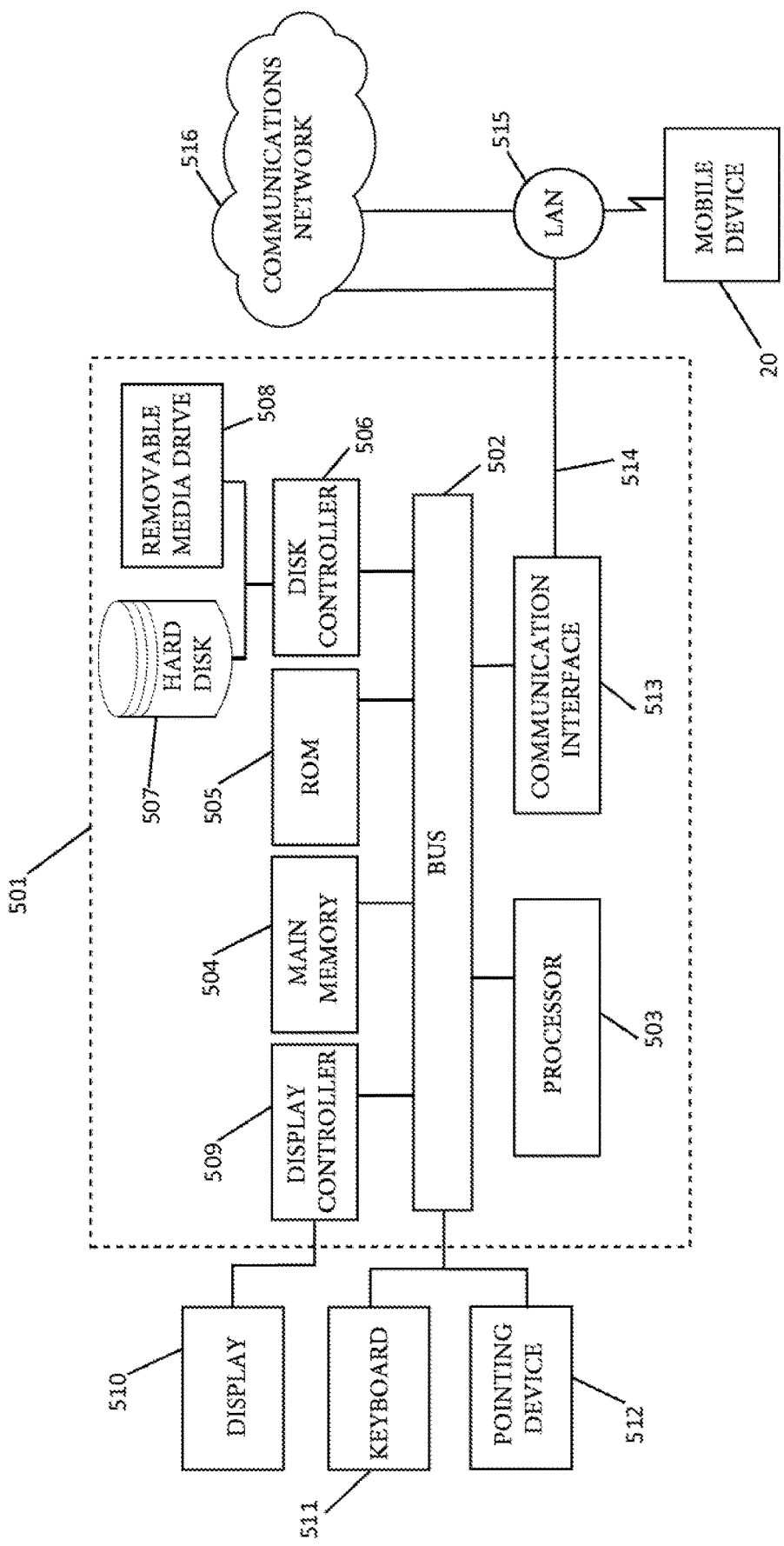
FIG. 5 is a diagram of an example computing system for use in a dynamic display in accordance with some implementations.

By one embodiment, each of the functions of the described embodiments may be implemented by one or more processing circuits. For example, as shown in FIG. 5, a processing circuit can include a programmed processor (for example, processor 503) that includes circuitry. A processing circuit can also include devices such as an application-specific integrated circuit (ASIC) and/or circuit components that are arranged to perform the recited functions.

FIG. 1 is a diagram of an example dynamic display environment 100 in accordance with some implementations. The environment 100 includes a first dynamic display system 102, a display 104, a transceiver 106, a server 108, a destination system 110, a data store 112, an optional second dynamic display system 114, and a second display 116. Also shown in environment 100 is a user device 118. It will be appreciated that a dynamic display environment can include more or less of the components, devices, or systems shown in FIG. 1.

The dynamic displays (102 and/or 114) operate according to one or more of the methods described below (e.g., in FIGS. 2-4)

Figure 2:
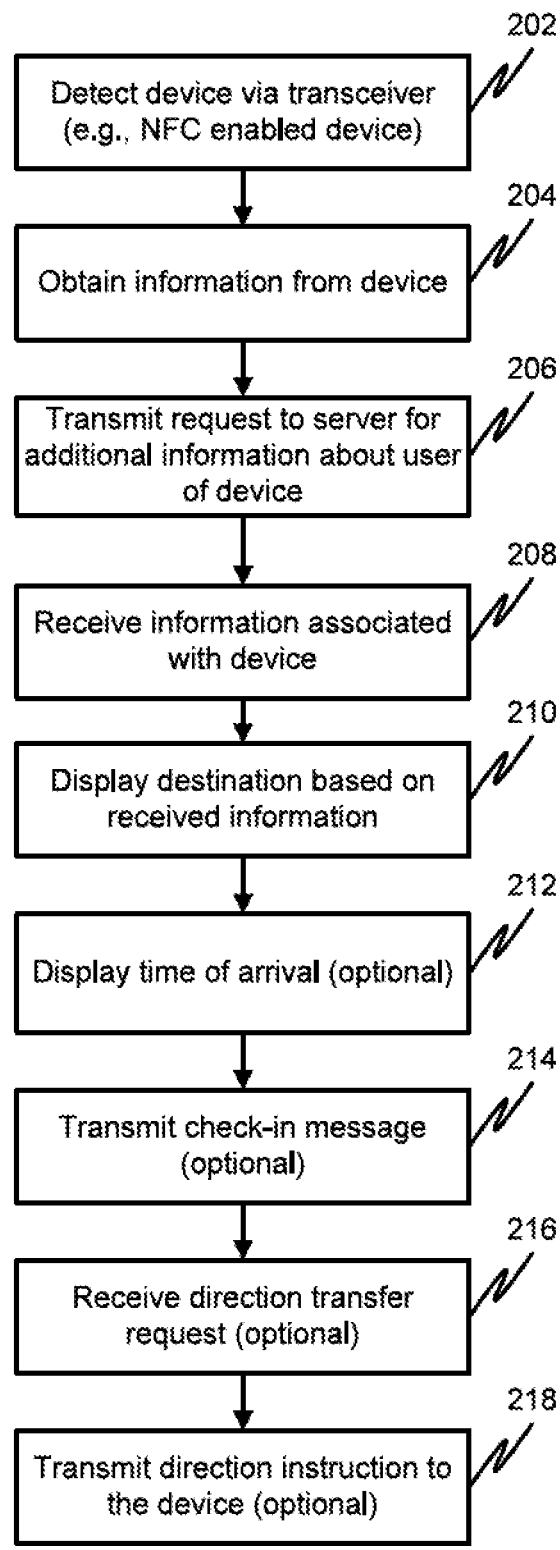
FIG. 2 is a flowchart of an example method for dynamic display of information in accordance with some implementations.

FIG. 2 is a flowchart of an example method for dynamic display of information in accordance with some implementations. Processing begins at 202, where a device (e.g., 118) is detected by a transceiver (e.g., 106) of a dynamic display system (e.g., 102). The device 118 can include a transceiver as well. In some implementations, the transceiver 106 and/or the device transceiver can include a near field communication (NFC) transceiver, Bluetooth, Wi-Fi, or the like. The detection can be performed by the transceiver 106 of the dynamic display 102 listening or monitoring for a device with a transceiver to be near (e.g., in communication range) of the dynamic display 102. The transceiver 106 can also periodically transmit a signal to which any nearby devices with corresponding transceivers can receive and respond to by transmitting a signal to the transceiver 106. Processing continues to 204.

At 204, information is obtained from the device. For example, the dynamic display system can query the device for user information such as student ID or patient ID. In general, any information identifying the device and/or a user associated with the device can be obtained.

Processing continues to 206.

At 206, the dynamic display system transmits a request to a server (e.g., 108). The request can include a request for additional information associated with the information obtained in 204. For example, the dynamic display system can transmit a student ID and a request to retrieve a student schedule. In another example, the dynamic display system can transmit a patient ID to the server along with a request for patient appointments, etc. Processing continues to 208.

At 208, the information requested from the server is received. For example, the dynamic display can receive a student course schedule or a patient appointment schedule. Processing continues to 210.

At 210, the dynamic display system displays a destination based on the information received from the server. For example, in the case of a student, the dynamic display can display the room where the next course for the student is taking place as a destination. In another example, in the case of a patient, the dynamic display can display the room where the next appointment or treatment for the patient is to be performed. The destination can be determined based on the received information and the day and/or time of day. Processing continues to 212.

At 212, a time of arrival is optionally displayed. The time of arrival can be based on the location of the dynamic display, the destination location, and the mode of transportation (e.g., walking, biking, car, etc.). Processing continues to 214.

At 214, the dynamic display system can optionally transmit a check-in message to a destination system (e.g., 110). The check-in message can include an indication of the current location of the user and an estimated time of arrival of the user. Processing continues to 216.

At 216, the dynamic display system optionally receives a direction transfer request. For example, the user device can request direction transfer. Processing continues to 218.

At 218, the direction instructions (e.g., navigation directions) are optionally transmitted to the device in response to the request. The directions can include directions to navigate from the current location (e.g., location of the dynamic display) to the destination.

Figure 3:
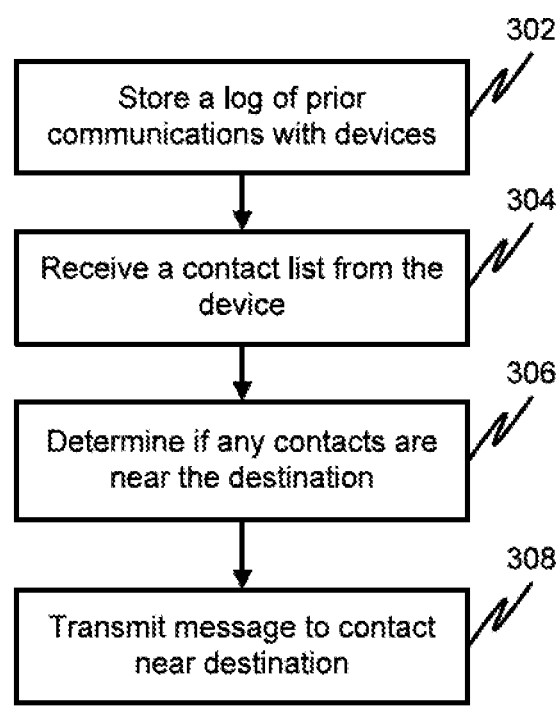
FIG. 3 is a flowchart of an example method for dynamic display of information in accordance with some implementations.

FIG. 3 is a flowchart of an example method for dynamic display of information in accordance with some implementations. Processing begins at 302, where a dynamic display system stores a log of prior communications with devices (e.g., stores a record of prior communications in data store 112). The log can include one or more of date, time, device ID, user ID associated with the device, location of dynamic display, destination location, etc. Processing continues to 304.

At 304, the dynamic display system receives a contact list from the device. The contact list can include names, phone numbers, email address, etc. Processing continues to 306.

At 306, the dynamic display system determines if any of the user's contacts are near the destination. For example, the dynamic display at the user's location can communicate with another dynamic display system (e.g., 114) at or near a destination location to determine if any of the contacts of the user at the dynamic display system are at or near the destination. Processing continues to 308.

At 308, the dynamic display can optionally transmit a message to one or more of the contacts near the destination. For example, the dynamic display can transmit a message to let contacts of the user know that the user will be at the destination in the estimate time of arrival.

Figure 4:
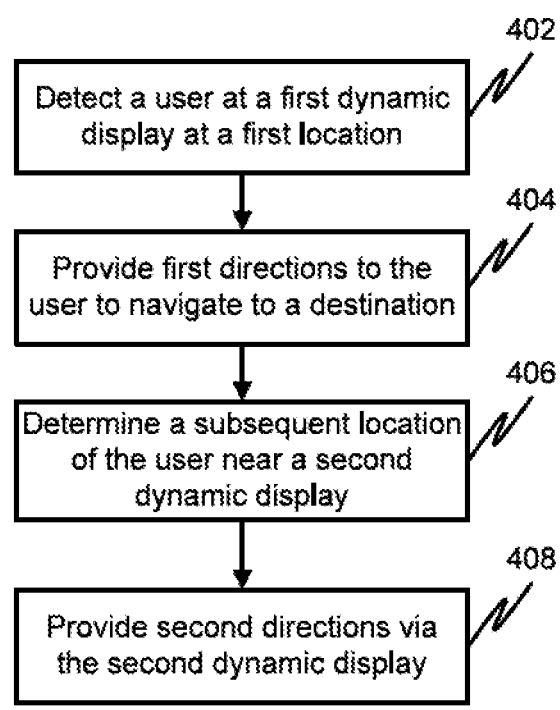
FIG. 4 is a flowchart of an example method for dynamic display of information in accordance with some implementations.

FIG. 4 is a flowchart of an example method for dynamic display of information in accordance with some implementations. Processing begins at 402, where a user is detected at a first dynamic display system (e.g., 102). Processing continues to 404.

At 404, the dynamic display system can provide first directions to the user to help the user navigate to a destination. Processing continues to 406.

At 406, a subsequent location of the user is determined is determined to be near a second dynamic display system. Processing continues to 408.

At 408, second directions are provided to the user from the second dynamic display system. The methods described above can be repeated in whole or in part, or in different orders, to accomplish a contemplated dynamic display operation.

The various features discussed above may be implemented by a computer system (or programmable logic). FIG. 5 illustrates such a computer system 501, computer system 501 may also be referred to as smart sign 501 and/or dynamic display 501. In one embodiment, the computer system 501 is a particular, special-purpose machine when the processor 503 is programmed to perform generation of drive signals to control a dimming interface of a plurality of LEDs, and other functions described above.

The computer system 501 includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA). The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 501 may also include a display controller 509 coupled to the bus 502 to control a display 510, for displaying information to a computer user. The computer system includes input devices, such as a keyboard 511 and a pointing device 512, for interacting with a computer user and providing information to the processor 503. The pointing device 512, for example, may be a mouse, a trackball, a finger for a touch screen sensor, or a pointing stick for communicating direction information and command selections to the processor 503 and for controlling cursor movement on the display 510.

The processor 503 executes one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 501, for driving a device or devices for implementing the features of the present disclosure, and for enabling the computer system 501 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 503 for execution. A computer readable medium may take many forms, including but not limited to, non-volatile media or volatile media. Non-volatile media includes, for example, optical, magnetic disks, and magneto-optical disks, such as the hard disk 507 or the removable media drive 508. Volatile media includes dynamic memory, such as the main memory 504. Transmission media, on the contrary, includes coaxial cables, copper wire and fiber optics, including the wires that make up the bus 502. Transmission media also may also take the form of acoustic or light waves, such as those generated during radio wave and infrared data communications.

Various forms of computer readable media may be involved in carrying out one or more sequences of one or more instructions to processor 503 for execution. For example, the instructions may initially be carried on a magnetic disk of a remote computer. The remote computer can load the instructions for implementing all or a portion of the present disclosure remotely into a dynamic memory and send the instructions over a telephone line using a modem.

A modem local to the computer system 501 may receive the data on the telephone line and place the data on the bus 502. The bus 502 carries the data to the main memory 504, from which the processor 503 retrieves and executes the instructions. The instructions received by the main memory 504 may optionally be stored on storage device 507 or 508 either before or after execution by processor 503.

The computer system 501 also includes a communication interface 513 coupled to the bus 502. The communication interface 513 provides a two-way data communication coupling to a network link 514 that is connected to, for example, a local area network (LAN) 515, or to another communications network 510 such as the Internet. For example, the communication interface 513 may be a network interface card to attach to any packet switched LAN. As another example, the communication interface 513 may be an integrated services digital network (ISDN) card. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local network 515 (e.g., a LAN) or through equipment operated by a service provider, which provides communication services through a communications network 510. The local network 514 and the communications network 510 can use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 513, which carry the digital data to and from the computer system 501 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 510, the network link 514 and the communication interface 513. Moreover, the network link 514 may provide a connection through a LAN 515 to a mobile device 517 such as a personal digital assistant (PDA) laptop computer, or cellular telephone.

Figure 6:
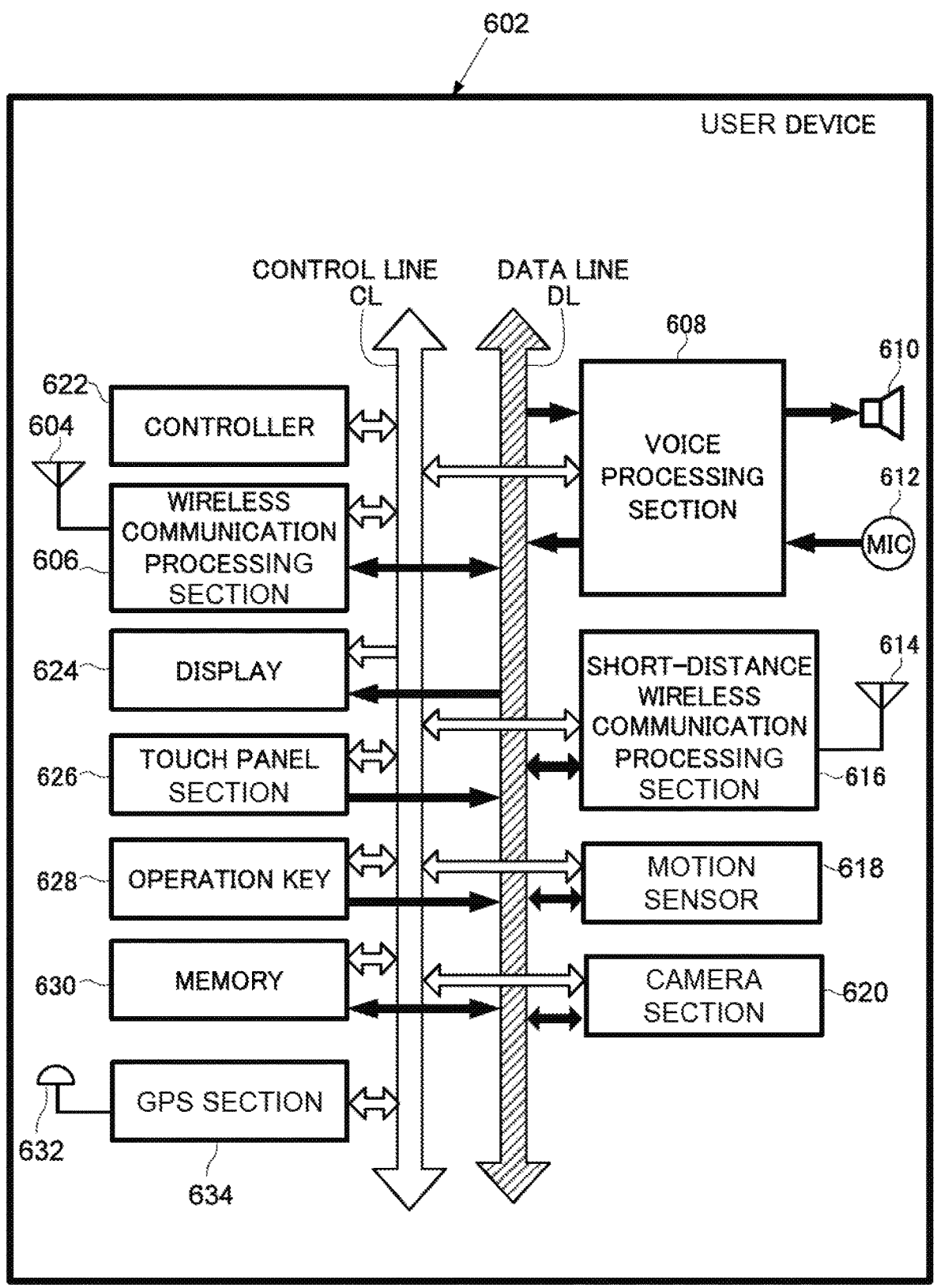
FIG. 6 is a diagram of an example user device in accordance with some implementations.

FIG. 6 is a more detailed block diagram illustrating an exemplary user device 602 according to certain embodiments of the present disclosure. In certain embodiments, user device 602 may be a smartphone. However, the skilled artisan will appreciate that the features described herein may be adapted to be implemented on other devices (e.g., a laptop, a tablet, a server, an e-reader, a camera, a navigation device, etc.). The exemplary user device 602 of FIG. 6 includes a controller 622 and a wireless communication processor 606 connected to an antenna 604. A speaker 610 and a microphone 612 are connected to a voice processor 608.

The controller 622 is an example of the processor 503 shown in FIG. 5 and may include one or more Central Processing Units (CPUs), and may control each element in the user device 602 to perform functions related to communication control, audio signal processing, control for the audio signal processing, still and moving image processing and control, and other kinds of signal processing. The controller 622 may perform these functions by executing instructions stored in a memory 630. Alternatively or in addition to the local storage of the memory 630, the functions may be executed using instructions stored on an external device accessed on a network or on a non-transitory computer readable medium. As described above in relation to FIG. 5, the controller 622 may execute instructions allowing the controller 622 to function as the display controller 509, operation management unit (not shown) depicted in FIG. 5.

The memory 630 is an example of the main memory 504 shown in FIG. 5 and includes but is not limited to Read Only Memory (ROM), Random Access Memory (RAM), or a memory array including a combination of volatile and non-volatile memory units. The memory 630 may be utilized as working memory by the controller 622 while executing the processes and algorithms of the present disclosure. Additionally, the memory 630 may be used for long-term storage, e.g., of image data and information related thereto. As disclosed in relation to FIG. 5, the memory 630 may be configured to store the battle view information, operation view information and list of commands.

The user device 602 includes a control line (CL) and a data line (DL) as internal communication bus lines. Control data to/from the controller 622 may be transmitted through the control line CL. The data line DL may be used for transmission of voice data, display data, etc. The antenna 604 transmits/receives electromagnetic wave signals between base stations for performing radio-based communication, such as the various forms of cellular telephone communication. The wireless communication processor 606 controls the communication performed between the user device 602 and other external devices via the antenna 604. For example, the wireless communication processor 606 may control communication between base stations for cellular phone communication or between the user device 602 and a display such as display 501 of FIG. 5.

The speaker 610 emits an audio signal corresponding to audio data supplied from the voice processor 608. The microphone 612 detects surrounding audio and converts the detected audio into an audio signal. The audio signal may then be output to the voice processor 608 for further processing. The voice processor 608 demodulates and/or decodes the audio data read from the memory 630 or audio data received by the wireless communication processor 606 and/or a short-distance wireless communication processor 616. Additionally, the voice processor 608 may decode audio signals obtained by the microphone 612.

The exemplary user device 602 may also include a display 624, a touch panel 626, an operation key 628, and a short-distance communication processor 616 connected to an antenna 614. The display 624 may be a Liquid Crystal Display (LCD), an organic electroluminescence display panel, or another display screen technology. In addition to displaying still and moving image data, the display 624 may display operational inputs, such as numbers or icons which may be used for control of the user device 602. The display 624 may additionally display a GUI for a user to control aspects of the user device 602 and/or other devices. Further, the display 624 may display characters and images received by the user device 602 and/or stored in the memory 630 or accessed from an external device on a network. For example, the user device 602 may access a network such as the Internet and display text and/or images transmitted from a Web server.

The touch panel 626 may include a physical touch panel display screen and a touch panel driver. The touch panel 626 may include one or more touch sensors for detecting an input operation on an operation surface of the touch panel display screen. The touch panel 626 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 626 may detect when the stylus approaches/contacts the operation surface of the touch panel display (similar to the case in which a finger is used for the touch operation).

One or more of the display 624 and the touch panel 626 are examples of the touch panel display 510 which may include keyboard 511 incorporated within and touch enabled, depicted in FIG. 5 and described above.

In certain aspects of the present disclosure, the touch panel 626 may be disposed adjacent to the display 624 (e.g., laminated) or may be formed integrally with the display 624. For simplicity, the present disclosure assumes the touch panel 626 is formed integrally with the display 624 and therefore, examples discussed herein may describe touch operations being performed on the surface of the display 624 rather than the touch panel 626. However, the skilled artisan will appreciate that this is not limiting.

For simplicity, the present disclosure assumes the touch panel 626 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 626 may include transparent electrode touch sensors arranged in the X-Y direction on the surface of transparent sensor glass.

The touch panel driver may be included in the touch panel 626 for control processing related to the touch panel 626, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 626 may detect a position of a user's finger around an edge of the display panel 624 (e.g., gripping a protective case that surrounds the display/touch panel).

Signals may be transmitted by the touch panel driver, e.g. in response to a detection of a touch operation, in response to a query from another element based on timed data exchange, etc. The touch panel 626 and the display 624 may be surrounded by a protective casing, which may also enclose the other elements included in the user device 602. In certain embodiments, a position of the user's fingers on the protective casing (but not directly on the surface of the display 624) may be detected by the touch panel 626 sensors. Accordingly, the controller 622 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 622 may be configured to detect which hand is holding the user device 602, based on the detected finger position. For example, the touch panel 626 sensors may detect a plurality of fingers on the left side of the user device 602 (e.g., on an edge of the display 624 or on the protective casing), and detect a single finger on the right side of the user device 602. In this exemplary scenario, the controller 622 may determine that the user is holding the user device 602 with his/her right hand because the detected grip pattern corresponds to an expected pattern when the user device 602 is held only with the right hand.

The operation key 628 may include one or more buttons or similar external control elements, which may generate an operation signal based on a detected input by the user. In addition to outputs from the touch panel 626, these operation signals may be supplied to the controller 622 for performing related processing and control. In certain aspects of the present disclosure, the processing and/or functions associated with external buttons and the like may be performed by the controller 622 in response to an input operation on the touch panel 626 display screen rather than the external button, key, etc. In this way, external buttons on the user device 602 may be eliminated in lieu of performing inputs via touch operations, thereby improving water-tightness.

The antenna 614 may transmit/receive electromagnetic wave signals to/from other external apparatuses, such as smart sign 501 and the short-distance wireless communication processor 616 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 616.

The user device 602 may include a motion sensor 618. The motion sensor 618 may detect features of motion (i.e., one or more movements) of the user device 602. For example, the motion sensor 618 may include an accelerometer to detect acceleration, a gyroscope to detect angular velocity, a geomagnetic sensor to detect direction, a geolocation sensor to detect location, etc., or a combination thereof to detect motion of the user device 602. In certain embodiments, the motion sensor 618 may generate a detection signal that includes data representing the detected motion. For example, the motion sensor 618 may determine a number of distinct movements in a motion (e.g., from start of the series of movements to the stop, within a predetermined time interval, etc.), a number of physical shocks on the user device 602 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 622, whereby further processing may be performed based on data included in the detection signal. The motion sensor 618 can work in conjunction with a Global Positioning System (GPS) section 634. The GPS section 634 detects the present position of the terminal device 100. The information of the present position detected by the GPS section 634 is transmitted to the controller 622. An antenna 632 is connected to the GPS section 634 for receiving and transmitting signals to and from a GPS satellite.

The user device 602 may include a camera section 620, which includes a lens and shutter for capturing photographs of the surroundings around the user device 602. In an embodiment, the camera section 620 captures surroundings of an opposite side of the user device 602 from the user. The images of the captured photographs can be displayed on the display panel 624. A memory section saves the captured photographs. The memory section may reside within the camera section 620 or it may be part of the memory 630. The camera section 620 can be a separate feature attached to the user device 602 or it can be a built-in camera feature.

In one exemplary embodiment, the dynamic display may include circuitry configured to communicate with a server via a wireless network, or device 602 either directly through wireless means, such as WiFi or NFC, or through the server. The circuitry may be further configured to detect a near field communication (NFC) enabled device in response to the NFC enabled device being within a predetermined distance from the dynamic display, send a request to retrieve student information from the NFC enabled device, the student information including the student's ID and class schedule stored on the NFC enabled device, and in response to receiving the student ID and class schedule from the NFC enabled device, the circuitry is further configured to display, on the display, a map of a campus including a current location of the dynamic display sign and a destination location linked to the received schedule, and an estimated time of arrival (ETA) to the destination location.

The linked location may be a location that the student is scheduled to be present at within a predetermined period of time from the time the NFC enabled device is detected by the dynamic display sign. The circuitry may then transmit a check-in message to the server, the check-in message being a message indicative of a current location of the NFC enabled device corresponding to a student (or user) and including the estimated time of arrival to a destination location, the check-in message further including an instruction for the server to forward the current location of the student and the estimated time of arrival to a receiving device at the destination location, for example.

In response to receiving a direction transfer request from the NFC enabled device, the circuitry can be further configured to transmit a direction instruction that activates a navigation application within the NFC enabled device, the activated navigation application including navigation instructions from the location of the dynamic display sign to the destination location.

The circuitry can be further configured to store a log of all prior communications with the NFC enabled device and other NFC enabled devices for a predetermined period of time, download a contact list from the NFC enabled device, determine if a contact from the downloaded contact list is currently at the destination location, and transmit a message to the contact, the message including the current location and estimated time of arrival for the NFC enabled device. In doing so, the circuitry may determine the location of the contact based on a previously saved log of interaction between an NFC enabled device of the contact and the dynamic display sign.

In yet another exemplary embodiment, the dynamic display can collaborate with other dynamic displays within the campus and provide real time updates to a student based on a detected schedule, mode of transportation, and location. For example, if the dynamic display detects the student in a car at a parking lot, then the dynamic display may provide directions to exit the campus based on detected traffic patterns received from other dynamic displays.

For example, the dynamic display can coordinate with other detected mobile devices or other displays to determine traffic patterns for a specific exit, and provide routing information via a display to a user. For example, if a user is detected within the vicinity of the dynamic display, the dynamic display may determine a travel mode of the user (e.g. walking or driving), and provide routing/driving information based on the mode. In this regard, if the user is driving for example, then the dynamic sign can determine that the user is exiting the garage or campus and inform the user what outlets are based available. Additionally, or alternatively, if there are updates to the traffic pattern, the dynamic sign may provide a user with updated information via a text message or the like as an update. The dynamic sign may track the user either via a log of previous users that have previously connected to the dynamic sign, or by determining that the user is within a predetermined vicinity of a known location such as a dynamic display sign.

One would appreciate that such implementation may also be deployed internally, within a mall or a university setting or the like. And the dynamic signs may be used to provide users with location based updates, including directions, advertisement, and parking information and the like.

The dynamic display can be used with a variety of signs including campus gateway signs, directional signs, campus "you are here" freestanding map signs, campus "you are here" wall map signs, building identifier signs, building entryway signs, street name signs, parking lot signs, and the like. In some implementations, campus gateway signs that can include dynamic displays as described herein can be between about 1 m-2 m high and about 1 m-4 m wide. In some implementations, other signs such as the directional signs, campus "you are here" freestanding map signs, campus "you are here" wall map signs, building identifier signs, building entryway signs, street name signs, parking lot signs can include dynamic displays as described herein and can be about 0.5 m-3 m wide and about 1 m-2 m high. The example dimensions described above are for illustration purposes and are not intended to be limiting.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A dynamic display system comprising:
a processor;
a display coupled to the processor; and
a transceiver coupled to the processor,
wherein the processor is configured to perform operations including:
  detecting presence of a device using the transceiver;
  obtaining device information from the device, wherein the obtaining includes electronically querying, by the dynamic display, the device for an identifier including one of a student identifier or a patient identifier and receiving the student identifier or the patient identifier from the device in response to the querying;
  transmitting, to a server, a request for information associated with the device, wherein the request includes the student identifier or the patient identifier received from the device;
  receiving, from the server, the information associated with the device, wherein the information includes a student schedule or a patient appointment schedule for the student identifier or the patient identifier, respectively; and
  displaying a destination on the display, wherein the destination is based on the student schedule or the patient appointment schedule for the student identifier or the patient identifier, respectively.

2. The dynamic display system of claim 1, wherein the operations further include:
displaying an estimated time of arrival on the display, wherein the estimated time of arrival is based on a location of the device and the destination.

3. The dynamic display system of claim 1, wherein the operations further include transmitting from the dynamic display system to another system a check-in message.

4. The dynamic display system of claim 1, wherein the operations further include receiving, at the display, a direction transfer request, and, in response to the direction transfer request, transmitting a direction instruction to the device.

5. The dynamic display system of claim 1, wherein the transceiver is a near field communication transceiver.

6. The dynamic display system of claim 1, wherein the device is a mobile phone equipped with a communication section arranged to communicate with the transceiver.

7. The dynamic display system of claim 1, wherein the operations further include:
storing a log of prior communications between the dynamic display system and one or more other devices;
receiving a contact list from the device;
determining if any contacts in the contact list are near the destination; and
transmitting a message to any of the contacts near the destination.

8. The dynamic display system of claim 1, wherein the operations further include:
detecting, at the dynamic display system, a user at a first location;
providing first direction instructions to the user;
determining a subsequent location of the user; and
providing second direction instructions to the user via another dynamic display.

9. The dynamic display system of claim 1, wherein the operations further include:
coordinating, at the dynamic display, with one or more other detected mobile devices or other displays to determine traffic patterns for a specific exit; and
providing routing information via the dynamic display, to a user.

10. The dynamic display system of claim 9, further comprising:
configuring the dynamic display to determine a travel mode of a user and provide routing information based on the travel mode, after detecting the user within a vicinity the dynamic display.

11. A method comprising:
detecting presence of a device via a transceiver of a dynamic display;
obtaining device information from the device, wherein the obtaining includes electronically querying, by the dynamic display, the device for an identifier including one of a student identifier or a patient identifier and receiving the student identifier or the patient identifier from the device in response to the querying;
transmitting, to a server, a request for information associated with the device, wherein the request includes the student identifier or the patient identifier received from the device;
receiving, from the server, the information associated with the device, wherein the information includes a student schedule or a patient appointment schedule for the student identifier or the patient identifier, respectively; and
displaying a destination on a display, wherein the destination is based on the student schedule or the patient appointment schedule for the student identifier or the patient identifier, respectively.

12. The method of claim 11, further comprising displaying an estimated time of arrival on the display, wherein the estimated time of arrival is based on a location of the device and the destination.

13. The method of claim 11, further comprising transmitting from the dynamic display to another system a check-in message.

14. The method of claim 11, further comprising receiving, at the display, a direction transfer request, and, in response to the direction transfer request, transmitting a direction instruction to the device.

15. The method of claim 11, wherein the transceiver is a near field communication transceiver.

16. The method of claim 11, wherein the device is a mobile phone equipped with a communication section arranged to communicate with the transceiver.

17. The method of claim 11, further comprising:
storing a log of prior communications between the dynamic display and one or more other devices;
receiving a contact list from the device;
determining if any contacts in the contact list are near the destination; and
transmitting a message to any of the contacts near the destination.

18. The method of claim 11, further comprising:
detecting, at the dynamic display, a user at a first location;
providing first direction instructions to the user;
determining a subsequent location of the user; and
providing second direction instructions to the user via another dynamic display.

19. A nontransitory computer readable medium having stored thereon software instructions that, when executed by one or more processors, cause the one or more processors to perform operations including:
detecting presence of a device via a transceiver of a dynamic display;
obtaining device information from the device, wherein the obtaining includes electronically querying, by the dynamic display, the device for an identifier including one of a student identifier or a patient identifier and receiving the student identifier or the patient identifier from the device in response to the querying;
transmitting, to a server, a request for information associated with the device, wherein the request includes the student identifier or the patient identifier received from the device;
receiving, from the server, the information associated with the device, wherein the information includes a student schedule or a patient appointment schedule for the student identifier or the patient identifier, respectively; and
displaying a destination on a display, wherein the destination is based on the student schedule or the patient appointment schedule for the student identifier or the patient identifier, respectively.

20. The nontransitory computer readable medium of claim 19, wherein the operations further include:
storing a log of prior communications between the dynamic display and one or more other devices;
receiving a contact list from the device;
determining if any contacts in the contact list are near the destination; and
transmitting a message to any of the contacts near the destination.

* * * * *